March 14, 1939.　　　G. W. BELL　　　2,150,576
SUSPENSION OF AUTOMOBILES AND LIKE VEHICLES
Filed April 20, 1936　　　9 Sheets-Sheet 1

Inventor.
Ginae William Bell.

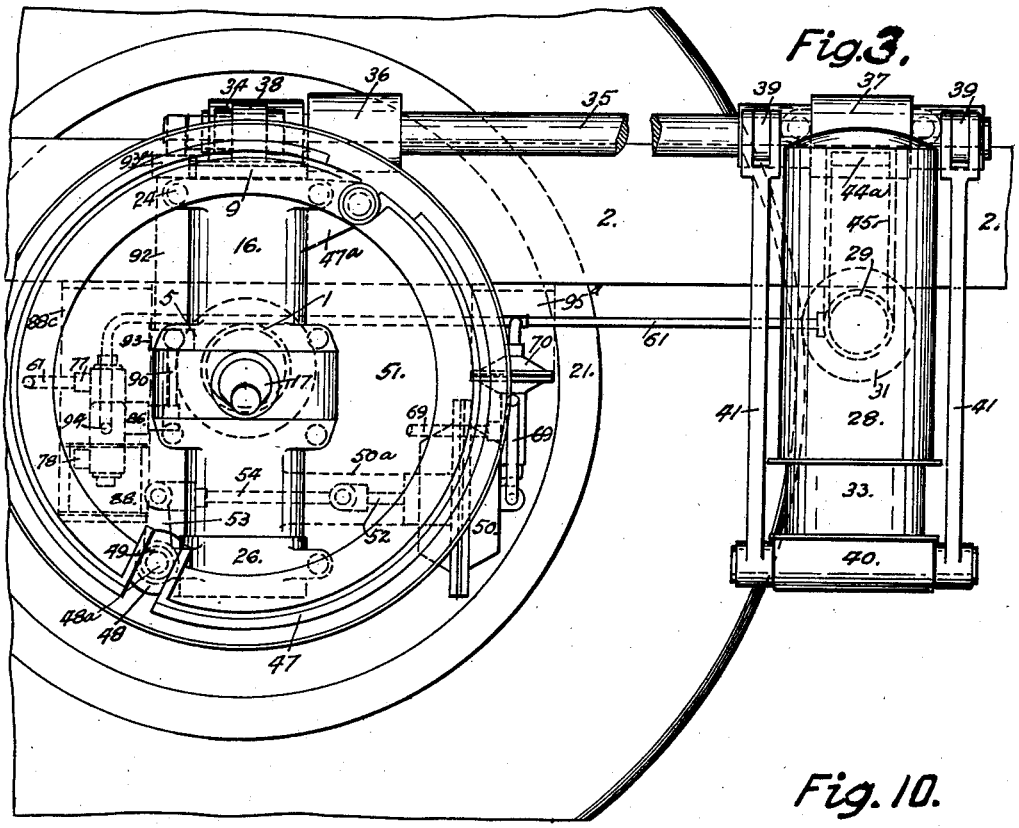
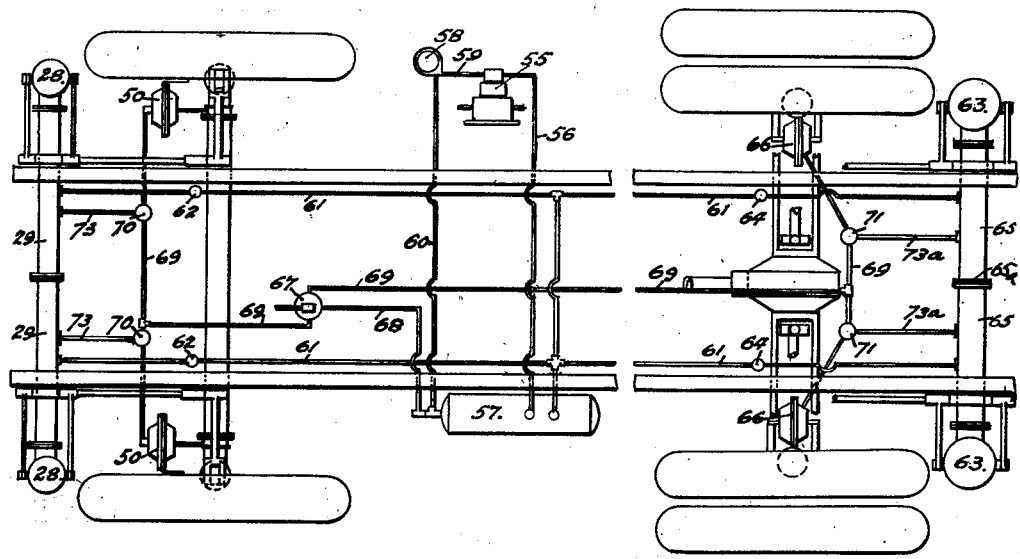

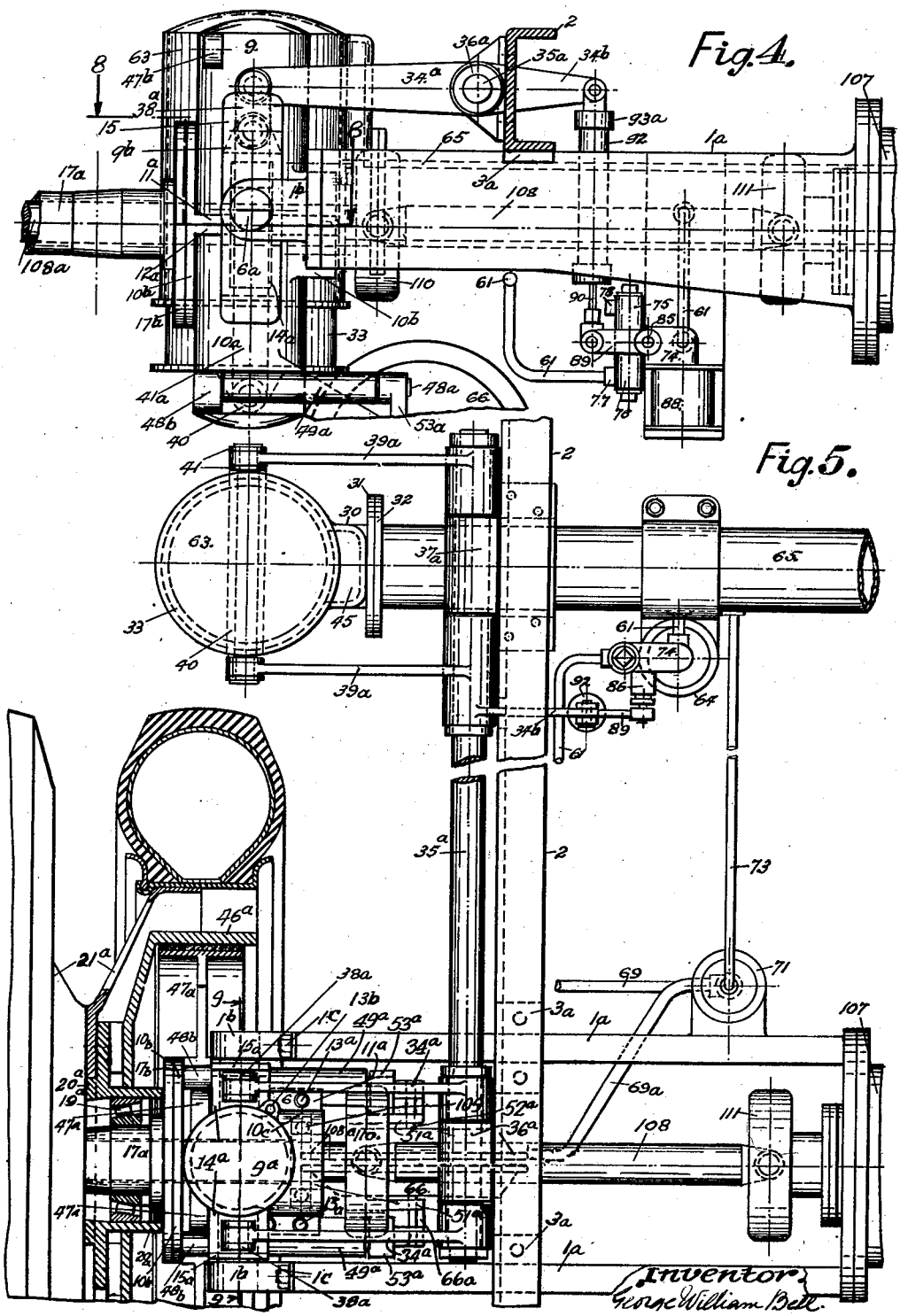

Inventor
George William Bell.

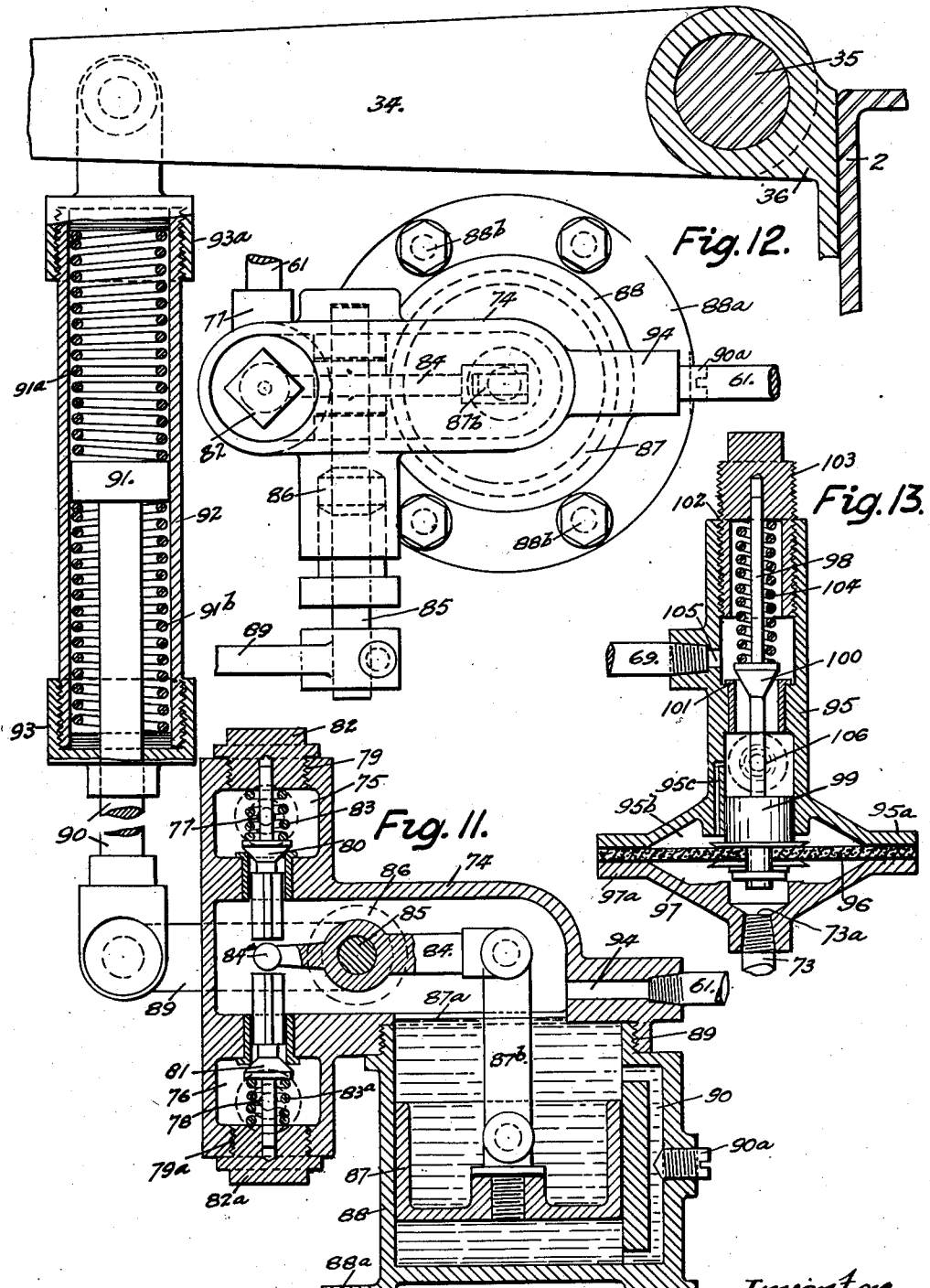

March 14, 1939. G. W. BELL 2,150,576
SUSPENSION OF AUTOMOBILES AND LIKE VEHICLES
Filed April 20, 1936 9 Sheets-Sheet 6
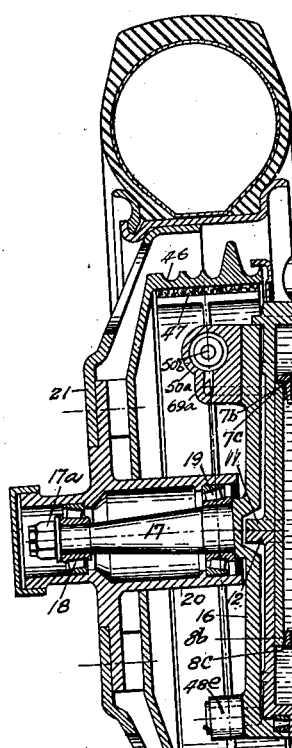
Inventor.
George William Bell.

March 14, 1939.  G. W. BELL  2,150,576
SUSPENSION OF AUTOMOBILES AND LIKE VEHICLES
Filed April 20, 1936  9 Sheets-Sheet 7
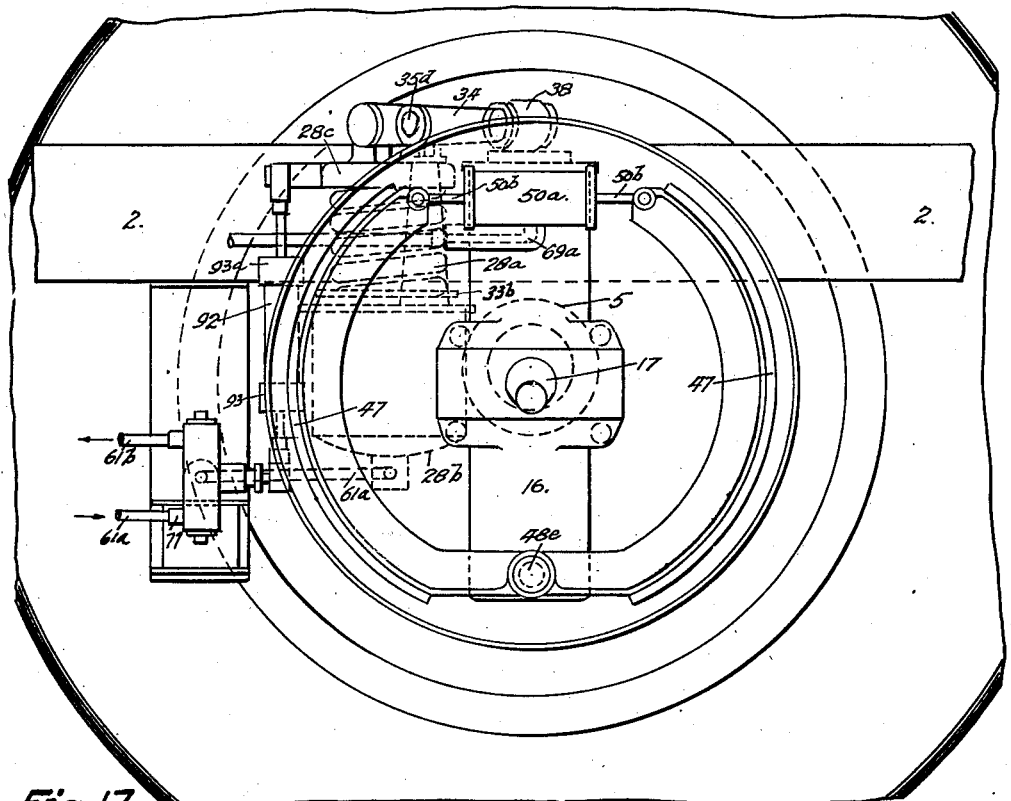
Fig. 17.
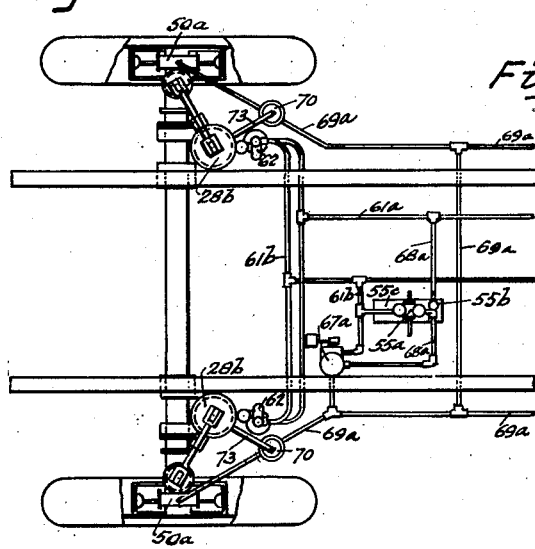
Fig. 20.
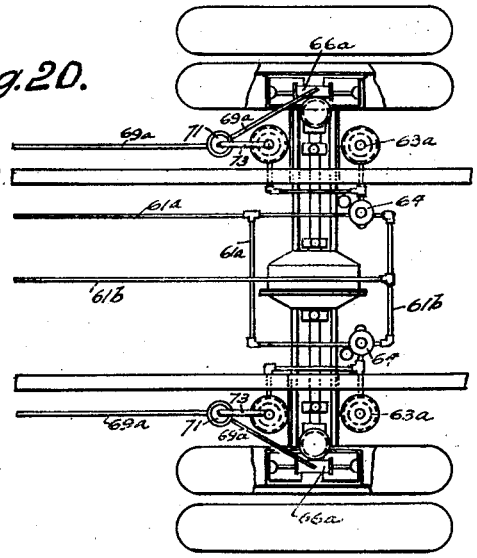
Inventor
George William Bell.

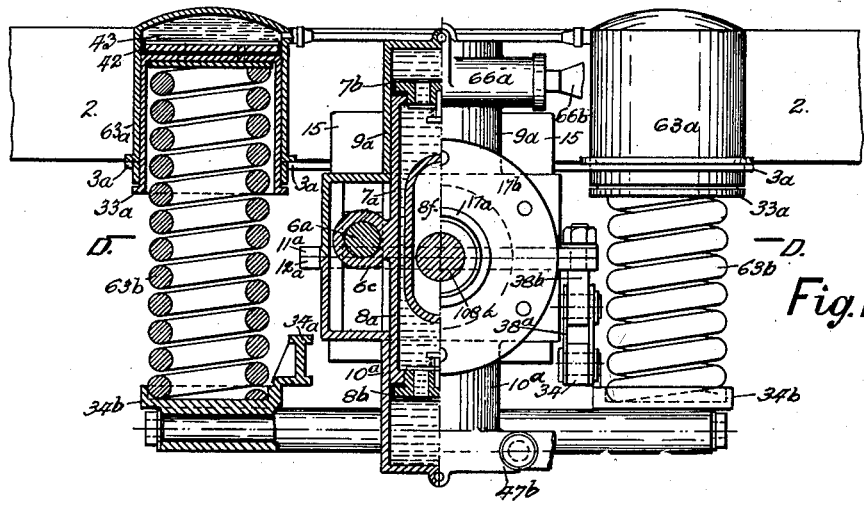
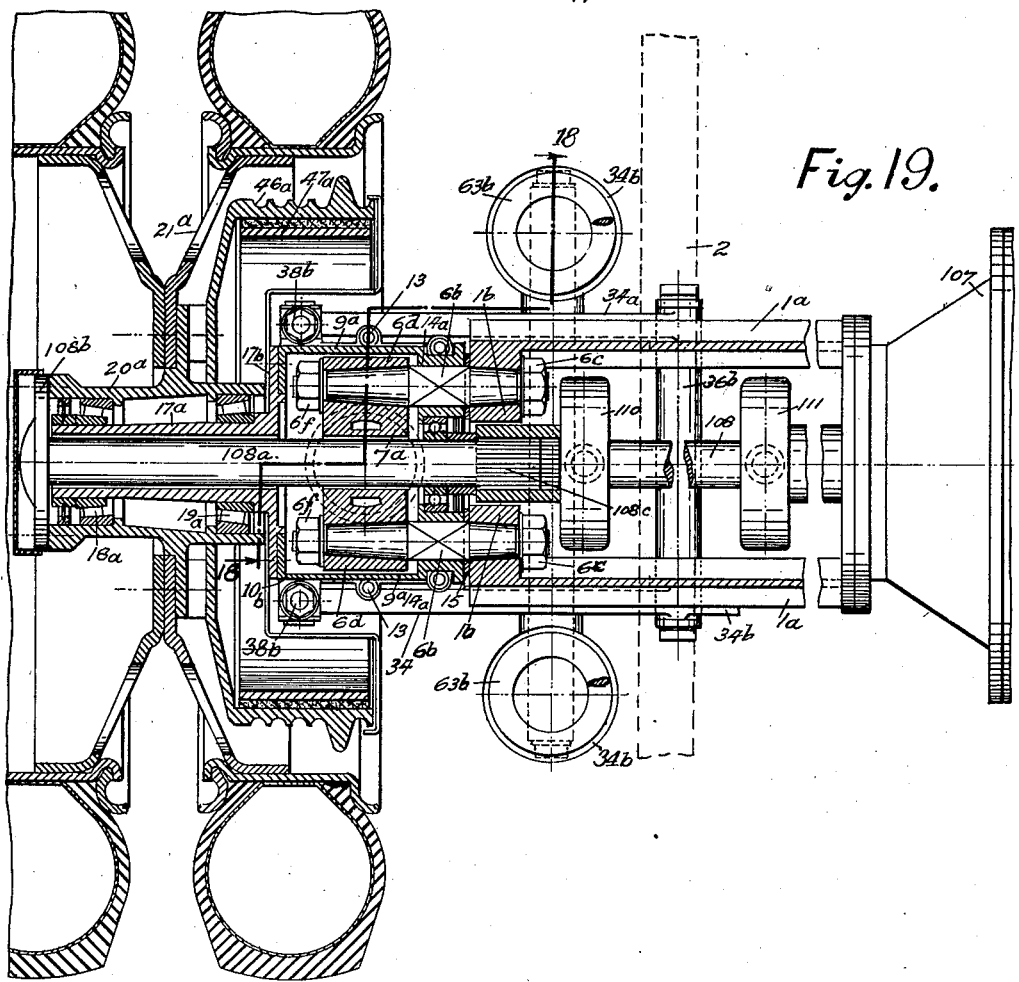

March 14, 1939.　　　　G. W. BELL　　　　2,150,576
SUSPENSION OF AUTOMOBILES AND LIKE VEHICLES
Filed April 20, 1936　　　9 Sheets-Sheet 9

Inventor
George William Bell.

Patented Mar. 14, 1939

2,150,576

UNITED STATES PATENT OFFICE 2,150,576

SUSPENSION OF AUTOMOBILES AND LIKE VEHICLES

George William Bell, Detroit, Mich.

Application April 20, 1936, Serial No. 75,389

16 Claims. (Cl. 280—124)

This invention relates to improvements in the suspension for automobiles, buses, trucks, trailers and rail vehicles, and has for its object to improve the riding qualities for passengers, reduce the road shocks for freight vehicles, and increase the pay-load by reduction of the "tare weight" of freight vehicle, by incorporating spring means having low frequency or high flexibility characteristics in combination with fluid means adapted to compensate the displacement of the same due to variation in the static load supported thereby, to maintain the frame or body of the vehicle at the normal position of suspension relative to the wheels or ground.

Another object is, in the type of suspension assemblies having vertical wheel guiding means disposed in or adjacent to the plane of the wheel, and having incorporated therewith elastic or spring means, to separate therefrom the said spring means, and dispose the same on the axle or frame of the vehicle to facilitate the embodiment therein of the characteristics required and above referred to, thereby eliminating difficulties associated with limited available space in the conventional wheel and provide means of transmitting the vertical motion of the wheel to the spring means and when required with variable ratio thereto, for all classes of vehicles.

Another object is, to provide independent sprung wheels, arranged to maintain a constant wheel track when vertically displaced, in the interest of tire wear, and by reduction in the unsprung weight and the independent action of each wheel on the road, increase the general efficiency of the suspension means.

A further object is, to limit the vertical movement or displacement of the wheel and axle, and therefore the angularity of the drive shaft to the wheels, to that only required to absorb the shock derived from the obstructions encountered in travelling over the normal road surface, thereby lessening the roll of the vehicle at the turns; the variation in the displacement of the spring suspension due to changes in the static load being automatically compensated by fluid means.

Another object is, to apply individual compensating control means to the suspension assembly of the respective wheels, to maintain the frame or body of the vehicle in its normal position of suspension, irrespective of the disposition of the load on the vehicle relative to the respective wheels, or where a vehicle is equipped with four or more wheels adjacent to each other, as in a six wheel truck or bogie of a rail car, to equalize or diffuse by fluid means, the shocks from the road to the associated wheel assemblies.

A further object is, to provide in the wheel guiding parts, snubbing or dash-pot action adapted to reduce or eliminate excessive rebound or reaction of the said spring means, localizing such action thereto, and cushion the movement of the wheel assembly at the extremities of the limited ambit of oscillations therein, due to action from road inequalities.

Another object is, where air under pressure elastically supports the vehicle and load, to provide means associated with the suspension assembly, adapted to permit comparatively low air pressure being used, viz, the pressure associated with the conventional air brake systems as applied to automobile equipment, thereby avoiding excessive wear and maintenance of the compressor.

Another object is, to automatically control the maximum braking pressure inadvertently applied to the wheels by the driver of the vehicle, when the latter is operated unloaded or with reduced loads relative to the maximum capacity thereof, to prevent locking or skidding of the wheels and destruction of the tires.

A further object is, to provide a combination forming the suspension assembly embodying the above characteristics and advantages, with relative few parts having great stability and adapted to reduce stresses to the frame, and be applicable for installation on the conventional chassis with standard wheels involving low cost and weight.

The respective cooperating parts or elements forming the combination of the suspension assembly, may operate or function in combination with one or both forms of elastic media without departing from the ambit or scope of the invention, viz, air or gaseous means, which may form both the elastic media as well as the fluid compensating means, or alternatively, the elastic media may be spring steel and cooperating liquid fluid compensating means or it may be a combination of both; in any case the combination of the parts or elements and their cooperation forming the suspension assembly, are substantially the same.

The high degree of flexibility of the springs under normal load is one of the main factors required for good riding qualities. To apply springs having these characteristics involves difficult problems of design, particularly where the ratio of "loaded weight" to the "tare weight" of the vehicle is great, due mainly to the excessive spring displacement between these extreme conditions. There is the further problem, if springs of the type referred to are applied to rail-car stock, of the buffer, bumper, and coupler heights to be maintained within definite limits; in a lesser degree these limits also apply to automobiles and trailers.

It is desirable therefore that with the adoption of this character of spring that the frame or body of the vehicle be maintained as close as possible at a predetermined position of suspension relative to the wheels when unloaded, and be maintained at this position irrespective of variations in the static load supported thereby, thereafter.

To apply spring means of higher flexibility than normally used, whether the elastic media be air or steel, requires greater space to accommodate either the increased volume of air or the displacement of the steel spring, for this reason and the fact that wheel diameters have been considerably reduced to meet the tire requirements, little space is left available for brake parts and suspension elastic media within the wheels.

To meet these conditions in the present invention, the wheel is vertically guided within or adjacent to its plane, and the elastic media of support, is disposed separate therefrom on the axle or frame of the vehicle, the vertical movements of the wheel assembly on the guide means being transmitted to the said elastic media with the least possible inertia or friction of the parts.

To cushion the wheel assembly at the limits of the available displacement thereof, and dampen excessive spring reaction of the same, the guide pistons and cooperating cylinders are adapted to act as a shock absorber or snubber, confining the stresses due to these reactions to the said assembly, thereby limiting the stresses to be transmitted to the spring means disposed on the axle or frame of the vehicle, to that normally associated with the load.

The brake control feature which forms part of this invention, is associated particularly with the type of suspension wherein the displacement of the spring means due to static changes in the load supported, is compensated by fluid means, and may be applied or incorporated with any conventional fluid actuating brake system, and with slight modification may be applied to mechanically operated brakes. In the accompanying drawings illustrating this control device, it is associated with conventional forms of air and liquid actuated brake systems.

The fluid used in the braking system may be the same as that used in the suspension compensating means as hereafter illustrated in the following description and drawings.

For the purpose of illustrating and describing my invention, reference is herewith made more particularly to air suspension means of desired high flexibility, using air under pressure as the compensating means to neutralize the spring displacement due to load changes, including illustrations and descriptions of the modification of the elastic media, viz, helical springs of high flexibility and liquid fluid means adapted to compensate the spring displacement.

With these and other objects in view the invention consists in the construction and combination of parts as will be described hereafter.

In the accompanying drawings:

Fig. 3 is a side view of Fig. 1.

Fig. 4 is a vertical transverse elevation of the rear axle and differential housing of a bus or truck, showing the stub axle, (without the wheel) guide cylinder, connecting lever to air chamber, air control mechanism and drive shaft to the wheel.

Fig. 5 is a plan view of Fig. 4, including a horizontal section through the inner of the wheels and brake parts mounted on the stub axle, the rest of the respective parts being shown in elevation.

Fig. 10 is a diagrammatic plan showing the arrangement of the connection of the air supply to the suspension assemblies and brake parts, comprising, air compressor, air reservoir tank, air brake chambers, and control valve mechanism for the respective assemblies.

Fig. 11 is a vertical sectional view taken at section line 11—11 Fig. 1 of the air control valve mechanism associated with the air suspension spring, including the liquid damping device and the tube containing the spring assembly through which the valves are actuated.

Fig. 12 is a plan of Fig. 11.

Fig. 13 is a vertical view taken at section line 13—13 Fig. 1 of a diaphragm control valve adapted to regulate the brake pressure.

Fig. 14 is a transverse vertical sectional view of a front wheel for a bus or truck, mounted on a stub axle showing the steering yoke, guide piston and cylinder in section, and the axle, helical suspension springs and liquid compensating chamber with liquid control valve mechanism in elevation.

Fig. 15 is a plan (without the wheel) of the parts shown in Fig. 14.

Fig. 16 is a vertical section at 16—16 Fig. 15 of the spring and liquid compensating chamber means.

Fig. 17 is a side elevation of Fig. 15.

Fig. 18 is a vertical sectional and elevational view at section line 18—18 Fig. 19 of the helical spring suspension associated with liquid compensating chamber means, applied to the rear drive wheels of a bus or truck.

Fig. 19 is a sectional plan of a twin tired wheel, and brake parts mounted on the stub axle Fig. 18, showing the guide piston and cylinder in section, and the drive shaft with universal joints and other parts in elevation.

Fig. 20 is a diagrammatic plan showing the liquid pump and reservoir, control valves, and parts of the liquid system associated with the compensating means of the suspension assemblies and the brake actuating means.

Figures 1, 2:
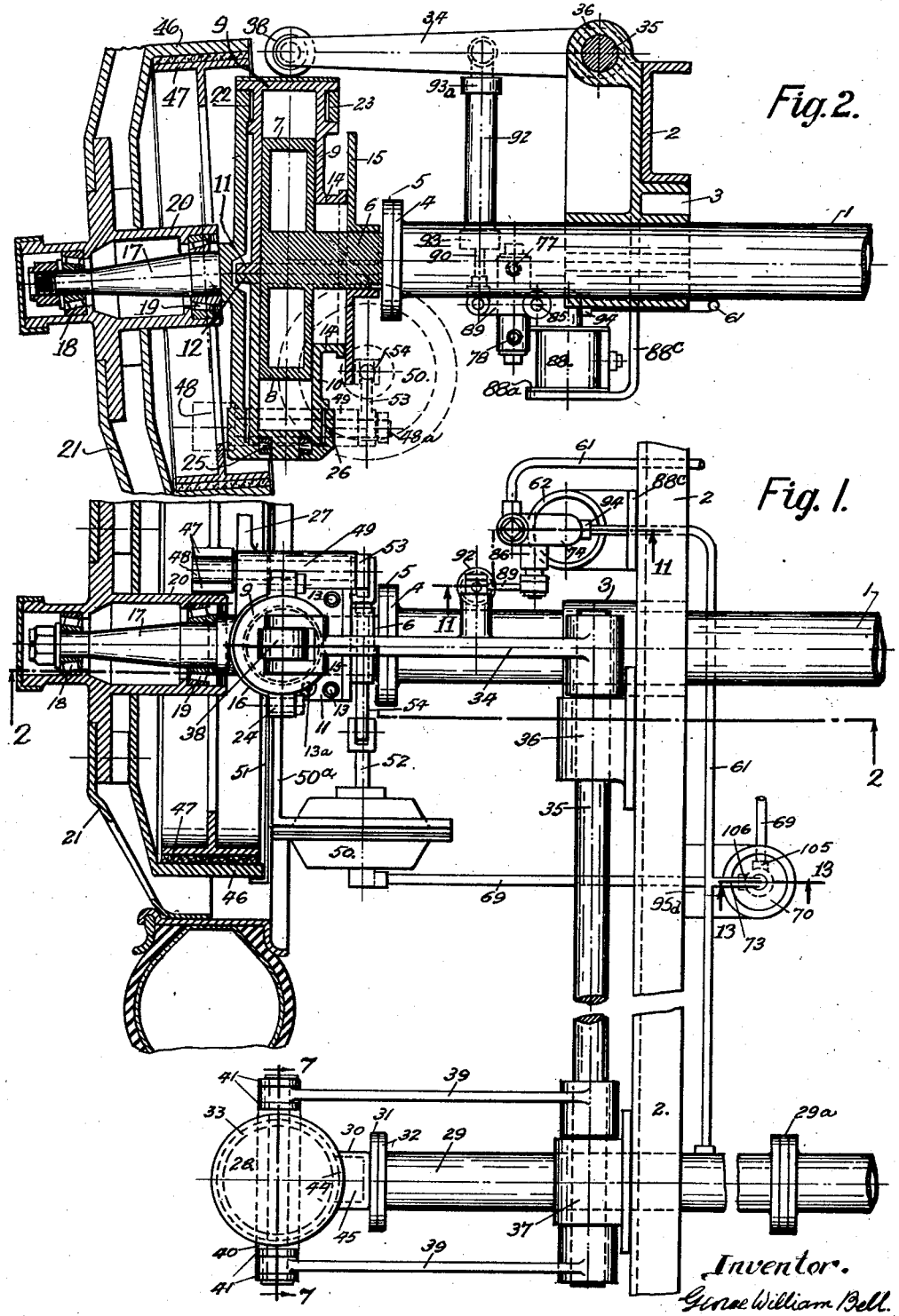
Fig. 1 is a plan view of an air suspension assembly applied to the front wheels of a bus or truck showing the wheel and brake drum in section, and the rest of the parts in elevation including a conventional type of air brake chamber adapted to operate the brake shoes.
Fig. 2 is a vertical elevation taken at 2—2, Fig. 1, showing the guide piston, cooperating cylinder, steering yoke, and side rail of the frame in section, the stub axle; (without the wheel) and other parts in elevation.

Referring to Figs. 1, 2, and 3 which illustrate an air suspension assembly associated with the front wheel and axle of a bus or truck, a tubular axle 1 is rigidly secured to the side-rail 2 of the frame by the bracket 3. Each end of the axle 1 terminates with the flange 4 to which a second flange 5, integral with a horizontally extending piston guide arm 6, supports at its outer end an upright piston 7 and a lower piston 8 integral with each other disposed in the vertical plane of the wheel. Cylinders 9 and 10 are adapted to engage respectively with the said pistons and be secured to each other by the flanges 11 and 12 and bolts 13.

The cylinders and wheel assembly associated therewith, reciprocate on the said pistons and form therewith dash-pots or snubbing means at the extremities of their travel thereon by compression of air or displacement of liquid. To free the movement of the axle in the central zone of displacement, conduit 13a formed in the wall of the cylinders 9 and 10 provide free communication between the latter, until one port of the conduit is cut off by the movement of the piston therein, which then compresses the remaining air disposed between the ends of the cylinders and pistons to cushion the parts; the cylinders 9 and 10 are guided against horizontal rotation thereon by the inwardly extending hollow arm 14 attached thereto, being in sliding engagement with the piston guide arm 6. The opening in the arm 14 is arranged to accommodate the vertical movement of the arm 6 therein. A cover plate 15 is provided and is in sliding contact with the face of the arm 14 to exclude dust therefrom.

Engaging with and mounted on the cylinders 9 and 10, is a steering yoke 16, having an outwardly extending stub axle 17 adapted to receive wheel bearings 18 and 19 on which the hub 20 of the wheel 21 rotates.

The yoke 16 is pivotally supported on the cylinders 9 and 10 by a bearing 22 disposed at the upper end of the cylinder 9 and secured thereto by the cap 23 which is attached to the yoke 16 by bolts 24, and by bearing 25 disposed around and between the end of the lower cylinder 10 and the cup 26 formed in the yoke 16, adapted to permit the said yoke to horizontally rotate the required degree for the purpose of steering the wheel mounted thereon. An arm 27 is attached to the lower end of the yoke 16 and provides means for the attachment of the cross steering connecting means and drag link associated with the steering parts disposed on the vehicle.

The air spring device is disposed separate from the wheel assembly on the axle or frame of the vehicle.

The air spring 28 is located at the outer end of a transversely disposed tube 29, rigidly attached to the side-rail 2. This tube, in addition to supporting the said device forms an air reservoir for any additional volume of air that may be required in the device to give the desired rate of flexibility to the spring action.

A black flange 29a in the center of the tube divides the tube into two separate chambers, one for each wheel assembly.

Figure 7:
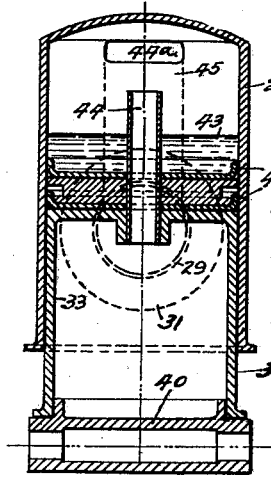
Fig. 7 is a vertical view of 28 at section line 7—7 of the air spring assembly shown in Fig. 1.

The air spring cylinder 28 is the same in constructional detail as that associated with the rear suspension assembly and is shown in detail in Figs. 1 and 7. The cylinder 28 is supported in the vertical plane by a projecting arm 30 having a flange 31 adapted to engage with a similar flange 32 of the tube 29.

To transmit the reciprocating movement of the cylinders 9 and 10 on the pistons 7 and 8, to the plunger 33, engaged in the air spring cylinder 28 cooperating members are provided comprising, a lever 34 keyed to the shaft 35, rotatably mounted on bearings 36 and 37, secured to the side-rail 2. The outer end of the lever 34 is provided with a roller 38 adapted to engage the top of the cylinder 9 and transmit the reciprocating motion of the latter to the oscillatory shaft 35. Similar levers 39, keyed to the shaft 35, are connected at their outer ends with the crosshead 40 of the plunger 33, by the connecting links 41.

To maintain the plunger 33 airtight in the cylinder 28, suitable cup leather packing rings 42 (see Fig. 7) are provided and sealed in the cylinder by liquid 43. A tube 4 secured in the upper face of the plunger 33 permits air communication between the space contained in the latter and cylinder 28, to augment the tubular reservoir space if required. The crosshead part 40 closes the lower end of the plunger and is made airtight therewith. A port 44a permits air communication with the reservoir 29 through the conduit 45.

Referring now to the braking arrangement, a brake drum 46 of the usual type is secured in the wheel 21 having associated therewith brake shoes 47, pivotally supported on bracket 47a Fig. 3 at the upper end of the yoke 16, and expanded by a rotatable cam 48 supported in a sleeve 49 attached to the lower end of the yoke 16 against the action of the usual retraction springs, (the latter not shown in the drawings).

To operate the cam 48 and brake shoes, a conventional type of air brake is here shown, having a diaphragm brake chamber 50 attached to the yoke 16 and back plate 51 by bracket 50a; the plunger 52 is attached to the crank 53 of the cam shaft 48a by links 54.

The arrangement for supply and control of air to and from the air spring cylinder of the respective suspension assemblies, and to the air brake mechanism, is diagrammatically illustrated in Fig. 10, to which reference is here made. A compressor 55, driven by the power means of the vehicle supplies air under pressure through conduits 56 to the reservoir tank 57. The operation of the compressor 55 is regulated to maintain a constant pressure in the tank by the governor 58, the latter is in communication with the compressor and tank respectively by conduits 59 and 60.

Air is supplied to the air spring cylinder 28 from the tank 57 through conduit 61, control valve 62, and reservoir 29. Similarly, supply is made to the rear wheels air spring cylinder 63 from the reservoir 57, through conduit 61, control valve 64, and reservoir 65. The air control valves 62 and 64 are operated by the vertical movement of the wheel assemblies relative to the frame of the vehicle, with changes in the load supported thereby.

Air is supplied to the front brake chambers 50, and rear brake chambers 66 from the tank 57, through the brake control valve 67, operated by the driver, by conduits 68 and 69 and diaphragm valves 70 and 71, (see Fig. 13) the latter valves being controlled by the air pressure in the respective reservoirs 29 and 65 through conduits 73 and 73a. These valves form a feature of this invention.

Referring now to the construction of the air control valves 62 and 64, Figs. 11 and 12 illustrate in section and elevation the detail of the inlet, outlet, and damping mechanism with the spring actuating means.

The control valve comprises a body 74 having branches forming valve chambers 75 and 76 and openings 77 and 78 respectively. Threaded openings 79 and 79a in the upper and lower branches permit introduction of the valves 80 and 81 in place, and their seats secured into the valve body 74. Threaded caps 82 and 82a close and seal the said openings 79 and 79a from fluid leakage and also guide the valve spindles therein. The valves 80 and 81 are normally maintained on their seats by the compression springs 83 and 83a. The respective valve stems are extended through the valve seats or openings and provide means for lifting the valves by means disposed within the body 74.

A lever 84 is mounted on a rotatable shaft 85, the latter pivotally supported within the body 74 and adapted to pass through a fluidtight stuffing box 86 to the outside. One end 84a of the lever 84 is disposed between the ends of the respective valve spindles, the opposite end thereof is rotatably connected to the liquidtight reciprocating piston 87, disposed in and cooperating with the cylinder 88; the latter is secured to the body 74 by threads 89 and made fluidtight therewith, the valve assembly is attached to the axle or frame of the vehicle by means of the flange 88a and bolts 88b and bracket 88c Fig. 1.

The cylinder 88 is maintained full of liquid 87a which submerges the piston 87. A conduit or passage 90 communicates with the upper and lower parts of the cylinder 88, and is provided with adjustable plug means 90a adapted to regulate the rate of flow of the liquid from one side of the piston 87 to the other side, when the latter is moved therein to retard the opening of the said valves 80 and 81, and dampen out action on the same, arising from vibrations caused by obstruction on the road. The piston 87 is connected to the end of the lever 84 by the link 87b.

To rotate the shaft 85 in either direction, an arm 89 is keyed and secured thereto and is rotatably attached to the piston rod 90b. This rod 90 is provided at its opposite end with a shoulder or piston 91 adapted to freely reciprocate and oscillate within the tube 92. A screwed cap 93 closes one end of the tube through which the piston rod 90 passes, a similar cap 93a closes the opposite end thereof, and forms also means of rotatably attaching the tube 92 to the rocking lever 34 on the shaft 35.

Between the piston 91 and the said caps 93 and 93a, compression springs 91a and 91b are provided and adapted to normally maintain the piston 91 in a central "off" or neutral position therebetween.

An opening 94, in the valve body 74 is provided to permit the air, supplied to or discharged from the valves 80 and 81 to pass to or from the air spring cylinder 28.

Referring to the construction of the air brake control valves 70 and 71, shown in detail and section in Fig. 13, the valve consists of a body 95 having at its lower end a circular flanged disk 95a, adapted to form a chamber therein 95b and receive and accommodate a flexible diaphragm 96, disposed between a flange 97a of a hollow cap 97 having an opening 73a therein, and a conduit 73 connected therewith in communication with the air spring cylinder 28. Bolts secure the flanges of the body, cap, and the diaphragm 96, fluidtight to the body 95.

A valve spindle 98 is centrally attached to the diaphragm 96 and made fluidtight therewith, and is fitted with and guided by a piston 99 in sliding engagement with the body 95. The valve 100 is integral with the spindle 98 and is arranged to engage with the valve seat 101, inserted in the body 95 through the threaded opening 102. A threaded plug 103 closes the opening 102 and forms guide means for the valve spindle 98 and also means for adjusting the pressure exerted on the diaphragm 96 by the compression spring 104, disposed between the shoulder of the valve 100 and the face of the plug 103.

Air from the reservoir tank 57 (Fig. 10), enters the valve body 95 through conduit 69 and opening 105 and passes out through the opening 106 to the respective brake chambers 50 and 66, and the diaphragm chamber 95b through opening 95c when the valve 100 is held "off" its seat by the action of the pressure in the air spring cylinder 28 on the diaphragm 96. A bracket 95d (see Fig. 1) engaging the flanges 95a and 97a provides means for securing the valve to the axle or frame.

Referring now to the operation of the above described equipment, which applies to the operation of each wheel assembly on the vehicle; it is assumed that the latter is stationary and empty of load and the suspension spring cylinders are inflated by air under pressure from the air reservoir tank to that required to maintain the frame of the vehicle in its normal position of suspension relative to the wheels.

With the loading of the vehicle the frame therefore is lowered, the increase of weight on the axle 1 forces the guide pistons 7 and 8 to the lower end of the cylinders 9 and 10, and the piston guide arm 6 will rest in the lower part of the arm 14.

The relative upward movement of the cylinders 9 and 10 therefore is transmitted to the lever 34, shaft 35, levers 39, connecting links 41, and to the plunger 33 which is thereby forced into the cylinder 28 against the pressure of air therein. This movement also raises the tube 92 attached to the lever 34, and compresses the lower spring 91b therein which, reacting on the piston 91, against the yielding fluid resistance of the damping piston 87, the latter in the cooperating cylinder 88, causes the piston rod 90 to rise and shaft 85 to rotate, and the upper valve 80 to be raised against the air and spring pressure from its seat, by the arm 89, permitting air to flow from the reservoir tank 57 through conduit 61, the opening 77, the valve 80, opening 94, and conduit 61, (see Figs. 2 and 10) to the reservoir 29 and thence to the air spring cylinder 28.

When sufficient pressure of air has entered cylinder 28 to raise the axle 1 to its normal position of suspension, and thereby permit the tube 92 to assume its normal position, the pressure exercised on the piston 91 by the compression spring 91b is relaxed, and the piston 91 is forced by the spring 91a to its "off" or neutral position.

When the vehicle is in operation on the road and the wheels meet obstruction, they are forced up or down momentarily from their normal position, this movement is transmitted to the tube 92 and compresses either of the springs 91a or 91b, which react on the piston 91, but owing to liquid friction interposed by the piston 87 in the cooperating cylinder 88, the movement is not effective in actuating the valves. Should the displacement persist over a period of time to allow the arm 84 to move against the retarding friction, one of the valves will be operated to permit the inflow or outflow of air. In this manner, vibrations arising from travelling over the road are prevented from actuating the valves and wasting air, as well as disturbing the normal position of suspension of the vehicle.

When the load is removed from the vehicle, the frame is raised relative to the wheels, the reduction in the weight on the front axle 1 causes the air pressure in the cylinder 28 to force the pistons 7 and 8 to the upper part of the cylinders 9 and 10, and the piston guide arm 6 to the upper part of the arm 14.

With this movement the lever 34 and the tube 92 are forced down, compressing the upper spring 91a which reacts on the piston 91 and forces it downwards against the liquid frictional resistance of the said valve damping means, which retards the movement of the shaft 85, to force the lower outlet valve 81 from its seat by the action of the arm 89, and permits air to escape to the atmosphere from the cylinder 28 through opening 78. With the reduction of the air pressure in the latter, and the lowering of the frame, the tube 92 rises to its normal position, and the pressure exercised on the piston 91 by the compression spring 91a is relaxed, and the piston 91 is forced by the spring 91b to its "off" or neutral position, permitting the valve 81 to close.

Referring now to the operation of the air brake control valves 70 and 71, shown in Figs. 10 and 13; the function of this valve is to automatically cut off excessive pressure of air that the driver may inadvertently supply to the brake actuating devices when the vehicle is partly or completely unloaded and thereby lock or skid the wheels; to accomplish this, advantage is taken of utilizing the variation of air pressure in the suspension chamber or chambers which is proportional to the weight supported thereby, to control the maximum permissible air pressure to the brake mechanism under these circumstances. The chamber 97 being in communication with the air spring cylinder 28, the diaphragm is subjected to the same pressure therein, which normally holds the diaphragm 96 up against the stop and the valve 100 in the open position, permitting free flow of air to and from the brake chamber 50 with the operation of the air brake control valve 67.

To regulate the maximum pressure exerted on the brake shoes to the desired coefficient of cohesion between the tire and average road conditions, when the vehicle is unloaded, the pressure on the spring 104 acting on the diaphragm 96 is regulated by the screw plug 103, so that when the air pressure is applied to the brakes, acting on the upper face of the diaphragm 96 to augment the said spring pressure, they balance the air pressure on the opposite side of the diaphragm, additional pressure therefore forces the valve 100 to its seat and cuts off any further pressure being applied to the brakes, this pressure is the maximum safe amount for the minimum load supported, viz, the "tare weight" of the vehicle. With the release of the pressure of air from the brakes the valve 100 automatically opens.

As the load on the vehicle is increased the pressure of air in the chamber 97 and on the diaphragm 96 also increases, permitting a corresponding increase in the pressure to the brake chamber and therefore to the brake shoes before the valve 100 cuts off the supply, until the maximum load is reached when the danger of excessive pressure supplied by the driver is removed.

Referring now to Figs. 4 to 9 inclusive, which illustrate the suspension assembly associated with the rear driving wheels, axle and differential housing; the housing 107, is carried in this arrangement by the twin axle 1a disposed longitudinally on each side of the drive shaft 108, although it may be supported otherwise, and is bolted to the side-rail 2 of the frame by brackets 3 formed in the upper faces of the axles. At the outer end of each axle 1a caps 1b engage with the non-rotatable piston guide arms 6a and are adapted to be secured thereto by bolts 1c.

The piston guide arms 6a, (Figs. 8 and 9) are disposed parallel to the side-rail 2 of the frame and support an upper piston 7a and a lower piston 8a in the vertical plane. These pistons which are integral with each other are closed at their respective ends, and centrally provided with a transverse opening or passage therethrough, adapted to accommodate the vertical oscillatory movement of the stub drive shaft 108a. Cylinders 9a and 10a are adapted to engage respectively with the said pistons and be secured to each other by flanges 11a and 12a and bolts 13a. The cylinders and wheel assembly associated therewith reciprocate on the pistons and form therewith dash-pots or snubbing means at the extremities of their travel thereon, by compression of the air or displacement of liquid as described in reference to the front wheel assembly. To free the movement of the axle in the central zone of its activity, conduits 13b provide free communication between the upper and lower cylinders 9a and 10a until the ports of the said conduits, suitably located therein, are cut off by the movement of the piston which then compresses the remaining air or displaces the liquid disposed between the ends of the cylinders and pistons to cushion the parts.

Figure 8:
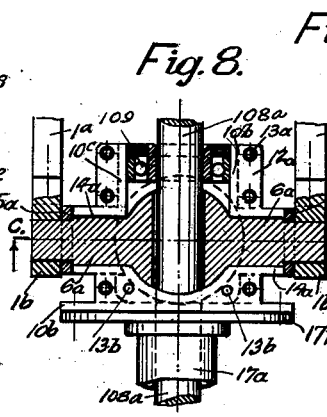
Fig. 8 is a sectional plan of the guide piston taken at section line 8—8 Fig. 4, showing the face of the horizontal flange of the cylinder and guide arms.
Figure 9:
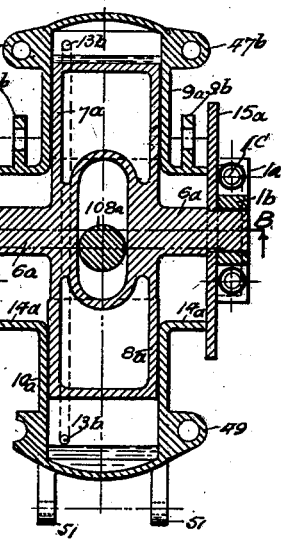
Fig. 9 is a vertical longitudinal section of the guide piston taken at section line 9—9 Fig. 5, showing the cylinder and hollow guide arms engaging the piston support arms to constrain the cylinder in the horizontal plane.

The cylinders 9a and 10a are guided against horizontal rotation thereon by the arms 14a attached to the cylinders and are adapted to engage with the vertical faces of the piston guide arms 6a and accommodate within the arms 14a the vertical movement of the latter, (Figs. 8 and 9). Cover plates 15a in sliding engagement with the faces of the said arms 14a, exclude dust therefrom.

An outwardly extending hollow stub axle 17a with flange 17b is adapted to engage with the flange 10b integral with the cylinders 9a and 10a.

Dual wheels 21a shown in plan Fig. 5, one in elevation and the other in section, are detachably secured to the hub 20a which is rotatably mounted on bearings of which 19a is shown on the stub axle 17a and secured endwise thereon. A stub drive shaft 108a is adapted to concentrically pass through the opening in the stub axle 17a, having at its outer end splines and cooperating flange means secured to the wheel hub 20a of a conventional form, (not shown in the drawings) and having at its inner end a bearing 109, (Fig. 8) disposed in the cylinder arc 10c to support the shaft therein. The oscillatory shaft 108 connects the stub drive shaft 108a to the drive shaft in the differential housing 107 through the universal joints 110 and 111 to which they are attached.

The air spring 63 is located at the outer end of the transversely disposed tube 65 rigidly attached to the side-rail 2 of the frame. This tube is divided by a blank flange 65a (see Fig. 10) into a reservoir for each rear wheel assembly.

The air spring cylinder 63 and cooperating parts are the same in construction and operation as that of the front wheel cylinders 28 already fully described in connection with Fig. 7.

To transmit the movement of the cylinders 9a and 10 on the pistons 7a and 8a, to the plunger 33, in engagement in the air spring cylinder 63, levers 34a are keyed to the shaft 35a, the latter being rotatably mounted on bearings 36a and 37a secured to the side-rail 2 of the frame. The outer end of the levers 34a are connected to the cylinder 9a by links 38a in oscillatory engagement with the lugs 9b integral with the cylinder 9a, and transmit the motion of the latter to the oscillatory shaft 35a. Similar levers 39a are also keyed to the shaft 35a, and are connected at their outer ends with the crosshead 40 of the plunger 33, the latter in engagement with the air spring 63 by the connecting links 41, which transmits the oscillatory movement of the shaft 35a to the same.

To maintain the plunger 33a airtight in the cylinder 63, cup leather packing rings 42 are provided and sealed with liquid 43, as already shown and described in reference to the front wheel cylinder 28, (Fig. 7).

Referring to the braking arrangement for the rear wheels; a brake drum 46a is secured to the wheel 21a, (Figs. 5 and 6) with engageable brake shoes 47a pivotally supported by lugs secured to the upper end of the cylinder 9a. The lower end of the shoes engage with cams 48b attached to shafts 48a. The shafts are carried in the sleeves 49a secured to each side of the cylinder 10a and rotated by cranks 53a. To operate the cams and equalize the pressure on the shoes 47a the brake chamber 66 is provided with a rod 66a attached thereto; and there is attached to the diaphragm a plunger 52a, the rod and plunger each being supported and in sliding engagement with the bracket 51a. Owing to the chamber and diaphragm assembly being floatingly supported between the brake shoes 47a when air is admitted to the chamber and diaphragm therein, through flexible air hose 69a, the automatic control valve 71 and brake control valve 67 operated by the driver, the reaction of the pressure therebetween rotates the shafts 48a with equal pressure to apply the brake shoes.

Air is supplied to the air spring cylinder 63 from the tank 57, Fig. 10, through conduit 61, control valve 64, and the reservoir 65. The air control valve 64 is operated by the lever 34b, Fig. 4, through tube 92, springs 91a and 91b, piston rod 90b, arm 89, shaft 85, and the rocking lever 84 which actuates either the lower inlet valve 79 or the upper outlet valve 80, Figs. 11 and 12.

Figure 6:
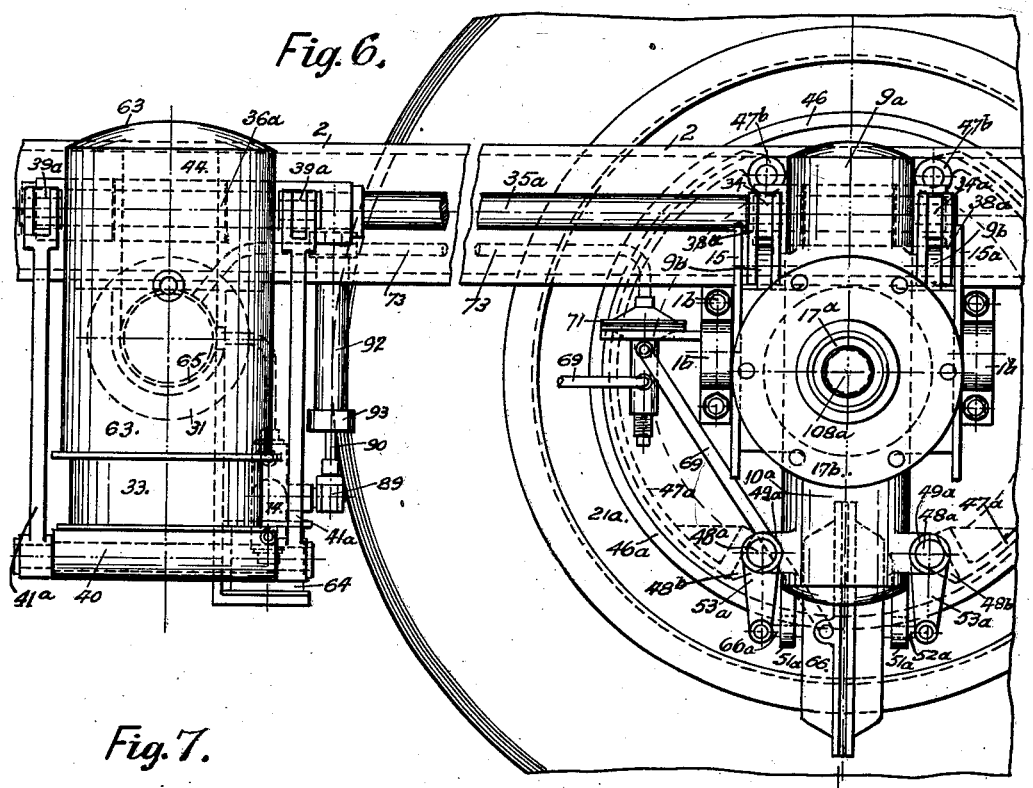
Fig. 6 is longitudinal view in elevation of Figs. 4 and 5, showing the stub axle, (without the wheel) guide cylinder, air spring cylinder, and connecting parts associated with the same including the air control mechanism for the brake actuating parts. The brake drum and parts shown, belong to the wheel disposed on the opposite side of the vehicle.

These valves are in the reversed positions compared to those associated with the front wheel assemblies, owing to the lever 34b being on the opposite side of the shaft 35, (Figs. 4, 5, and 6).

The supply and control of the air to the rear assemblies is the same as that already described in reference to the front wheel assemblies.

Referring to Figs. 14 to 23, illustrating my invention in combination with a modified type of the elastic media use in the suspension assembly, viz, helical steel springs of low frequency or high flexibility characteristics and liquid compensating means associated and cooperating therewith in lieu of air, and to the snubbing and brake actuating means also operated by the same liquid medium.

Referring to Figs. 14, 15, and 16 which illustrate in vertical section elevational plan and side view of the front wheel of a bus or truck, a tubular axle 1 is rigidly secured to the side-rail 2 of the frame or body of the vehicle by bracket 3. Each end of the axle 1 terminates with the flange 4, to which a second flange 5 is attached integral with the outwardly extending piston guide arm 6, and supports at its outer end an upper piston 7 and a lower piston 8 integral with each other and provided with a vertical opening therethrough, in or adjacent to the vertical plane of the wheel. Cylinders 9 and 10 are adapted to engage with the said pistons and be secured to each other by the flanges 11 and 12 and by bolts 13. The cylinders and wheel assembly associated therewith, reciprocate on the pistons and form liquid snubbing means to dampen out excessive rebound and reaction of the springs, by the action of the valve 8b disposed in the face of the lower piston 8 having a vent 8c in the valve to regulate the degree of snubbing.

When a double acting snubber is required a similar valve 7b is located in the upper face of the piston 7 having the required vent 7c. The space or chamber formed in the cylinders and pistons, is submerged in suitable liquid fluid through the filling and air bleeding opening 9e. The opening 10e' in the lower cylinder 10 provides means of emptying the chamber.

In operation each valve permits free flow of liquid in one direction by the opening of the valve, and creates resistance when the flow is reversed therethrough and the valve seated as the liquid is then forced through the vent. With the double acting type, (Fig. 14) the vents in the respective valves are each adjusted to the conditions of impact and rebound of the assembly.

The cylinders 9 and 10 are constrained against horizontal rotation on the pistons, by the arm 14 in sliding engagement with the piston guide arm 6 of the pistons 7 and 8 as described in reference to Figs. 1, 2 and 3.

Engaging with and mounted on the cylinders 9 and 10 is a steering yoke 16, having an outwardly extending stub axle 17, adapted to receive wheel bearings 18 and 19, on which the hub 20 and wheel 21 revolves. A nut 17a secures the wheel endwise on the stub axle 17.

The yoke 16 is pivotally secured to the cylinders 9 and 10 by bearing 22, disposed at the upper end of the cylinder 9 and secured thereto by the cap 23, which is attached to the yoke 16 by bolts 24, and by a bearing 25 disposed around and between the end of the lower cylinder 10 and a cup 26 formed in the yoke 16, adapted to permit the said yoke to horizontally rotate the required degree to steer the wheel mounted thereon. An arm 27 is attached to the lower end of the yoke 16 and provides means for attachment of the cross steering connecting means and drag link associated with the steering parts on the vehicle.

The helical steel spring, supporting the load, is disposed separate from the wheel assembly and is placed on the axle or frame, arranged to permit the transfer of the vertical movement of the wheel assembly to the spring means in ratio thereto depending on the characteristics of the latter.

In Figs. 14, 15, 16, and 17, the spring 28a is disposed and rests on the lower face of the hollow plunger 33b, the latter in reciprocable engagement with the cylinder 28b, and forms therewith the compensating chamber means.

The said assembly is supported by the bracket 3b attached to the axle 1 by clamps 3c and to the side-rail 2 by bolts 3d. The lower face of the plunger 33b, (Fig. 16) is provided with cup leather packing ring or rings 42a adapted to maintain the plunger tight against the pressure of the liquid 43a which comprises the means for displacing the said plunger 33b.

To transmit the reciprocating movement of the cylinders 9 and 10 on the pistons 7 and 8, to the helical spring 28a, a lever 34 is pivotally supported on the shaft 35 carried by the pedestal 35a, supported and secured to the bracket 3b. The outer end of the lever 34 is provided with a roller 38, adapted to engage with the top of the cylinder 9 and transmit the reciprocating motion of the latter to the spring 28a. The opposite end of the lever 34 is rotatably attached to a cap 28c which engages the spring 28a and transmits the weight of the vehicle and load and the vertical motion of the wheel assembly thereto.

Referring to the braking arrangement, a brake drum 46 is secured in the wheel 21, having associated therewith brake shoes 47, pivot means 48e supported at the lower end of the yoke 16 and at the upper end thereof, adapted to be expanded by conventional hydraulic actuating means, viz, a cylinder 50a attached to the yoke 16 and cooperating pistons 50b, (Fig. 15) engaging respectively the said brake shoes 47, having the usual retraction springs. Liquid under pressure is supplied to the cylinder 50a by the conduit 69a and the flexible hose 69b from the brake control valve actuated by the driver.

The supply and control of liquid under pressure to and from the compensating chamber formed in the cylinder of the respective suspension assemblies, and to the brake mechanism, is diagrammatically illustrated in Fig. 20, to which reference is here made.

A pump 55a, operated from the power plant of the vehicle is regulated to maintain a constant pressure by a spring loaded by-pass valve 55b of conventional type which permits the return of the liquid, when passed therethrough to the reservoir 55c, when there is no demand to supply the suspension assemblies or brake mechanism.

Liquid under pressure is supplied to the spring compensating chambers 28b of the front wheel and to chambers 63a of the rear wheel assemblies, from the pump 55a, through conduits 61a, control valves 62 and 64. The discharged liquid therefrom passes through conduit 61b to the pump reservoir 55c.

The liquid control valves 62 and 64 are operated by the vertical movement of the respective wheel assemblies.

Liquid under pressure is also supplied to the respective brake cylinders 50a of the front wheel and to 66a of the rear wheel assemblies from the pump 55a, through conduit 68a to the brake control valves 67a operated by the driver, by conduits 69a to the diaphragm control valves 70 and 71, and thence to the respective brake cylinders. The diaphragm chamber of the respective valves, (Fig. 13) is in communication with the compensating chambers 28a and 63a by conduits 73.

The liquid control valves 62 and 64, and the actuating tube 92 with spring means, are the same in construction and operation to those already described in reference to Figs. 11 and 12, with the exception that liquid under pressure fills the body 74 completely as it passes to and from the compensating chamber, and insures that the damping cylinder 88 is automatically filled with liquid.

The brake automatic control valves 70 and 71 are the same as already described in reference to Fig. 13, and operate by liquid pressure in lieu of air pressure.

Figure 21:
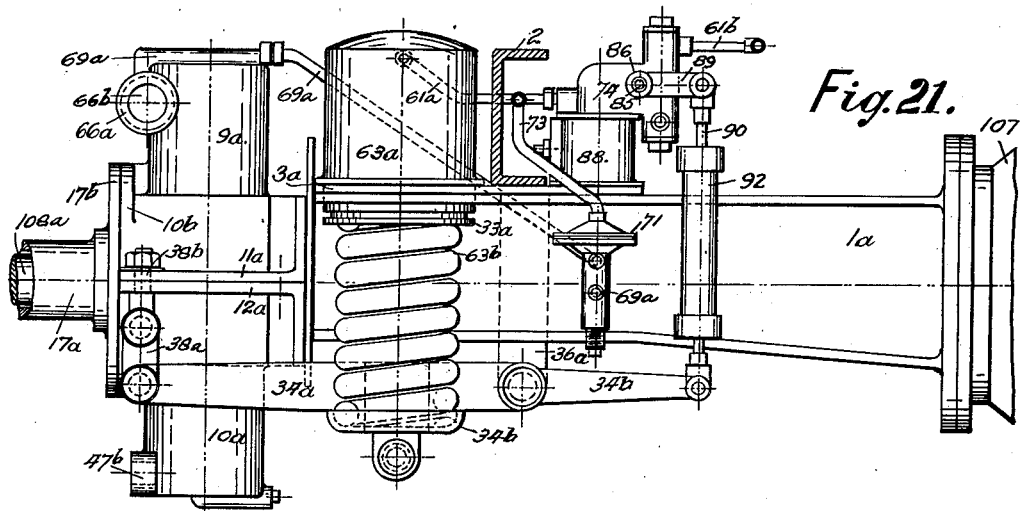
Fig. 21 is a transverse view in elevation of Figs. 18 and 19.

Referring to Figs. 18, 19, and 21, which illustrate my invention in combination with steel helical springs and liquid compensating means, as applied to the rear wheels of a truck or bus, the housing 107 is supported by the divided axle 1a disposed on each side of the drive shaft 108 and also supports the side-rail 2 of the frame to which it is attached by the bracket 3a. At the outer ends of the axles 1a, inwardly extending lugs 1b are provided and receive outwardly extending piston guide arms 6b which are keyed, and secured thereto by nuts 6c. The ends of the outward extending arms 6b are tapered and adapted to engage with centrally disposed lugs 6d, integral with the pistons 7a and 8a, and detachably secured thereto by nuts 6f.

The pistons 7a and 8a are respectively disposed above and below the axle or support means and are integral with each other.

The piston and cylinder assembly referred to cooperate to act as snubber means, to dampen excessive rebound or reaction of the springs and for this purpose the pistons are provided with valves 8a and 8b at their respective ends.

A transverse opening 8f or passage through the center of pistons 7b and 8b is provided through which the stub drive shaft 108a passes and accommodates the vertical movements of the same.

Cylinders 9a and 10a are adapted to engage respectively with the said pistons and be secured to each other by the flanges 11a and 12a and bolts 13. The cylinders are constrained against horizontal movement on the said pistons by the arms 14a attached thereto which engage with the vertical faces of the piston guide arms 6b and accommodate the vertical movement of the latter therein. Cover plates 15 exclude dust from the openings in the arms 14a.

An outwardly extending hollow stub axle 17a with flange 17b engages with the flange 10b integral with cylinders 9a and 10a.

Dual wheels shown in sectional plan (Fig. 19) are detachably secured to the hub 20, which is rotatably mounted on bearings 18a and 19a on the stub axle 17a and secured endwise thereon. A stub drive shaft 108a is adapted to pass through the opening in the stub axle 17a, and also through the transverse opening in the pistons, and has at its outer end a flange 108b detachably secured to the hub 20a, and at its inner end splines 108c engageable with the universal joint 110. The oscillatory shaft 108 connects the stub drive shaft 108a to the drive shaft in the differential housing 107, through the universal joints 110 and 111 to which they are attached.

Helical springs 63b disposed on each side of the drive shaft are adapted to engage at their upper ends with the inner face of the plunger 33a, in reciprocable engagement with the cylinder 63a, and are secured to the axles 1a and side-rail 2 by the bracket 3c and bolted thereto.

To transmit the reciprocating movement of the cylinders 9a and 10a on the pistons 7a and 8a, to the plunger 33a, engaged with the helical spring 63b, levers 34a disposed on each side of the drive shaft, are rotatably secured at their inner ends to the bracket 36a attached to the axle 1a, and at their outer ends to cylinders 9a and 10a by means of links 38a, pivotally secured to the studs 38b in the flanges 11a and 12a. The lower ends of the springs 63b rest in the cup brackets 34b attached respectively to each of the levers 34a. Therefore all oscillatory movement of the cylinders on the guide pistons is transmitted to and absorbed by the springs.

The plunger 33a is maintained liquid tight in the cylinder 63a in the manner already described.

Referring to the braking arrangement associated with the rear wheels, a brake drum 46a is secured to the wheel 21a, (Fig. 19) and associated therewith brake shoes 47a are pivotally attached to the lugs 47b integral with the lower cylinder 10a, (Figs. 18 and 21) and at their upper ends are connected to pistons 66b disposed in the hydraulic cylinder 66a. Liquid pressure applied to the pistons forces the shoes to the brake drum in the usual manner.

Liquid pressure is supplied to the hydraulic brake cylinders 66a from the driver's brake control valve 67a, through conduit 69a and automatic control valve 71; the chamber 97, (Fig. 13) is in communication with the compensating chamber 63a by conduit 73. The lever 34b is an extension of one of the levers 34a and actuates the liquid control valves by means of the tube 92 and springs therein and the arm 89 of the valve assembly 64, as heretofore described, (Figs. 11, 12 and 21).

Referring to the operation of the above described helical spring suspension assemblies; springs are disposed in the compensating cylinders 28a and 63a so that the plungers 33a will be at their innermost position therein when supporting the "tare weight" of the vehicle alone. This is the normal static position of suspension of the frame relative to the wheel.

With the loading of the vehicle, the frame therefore is lowered relative to the wheels, the movement, being of a permanent nature, sufficient time elapses to permit the spring pressure in the tube 92 to actuate and open the inlet valves, allowing the liquid to flow under pressure from the pump source, to the respective compensating chambers. The increase of pressure therein, jacks up the frame, body, and load, until the normal position of suspension is reached, when the valves are automatically closed. The liquid being substantially incompressible, provides compensation for the displacement of the springs due to the load applied. The springs, however, are free to absorb, within the limits provided in the wheel assemblies, shocks from obstructions met with on the road.

Due to the lag in the action of the liquid control valves, such obstructional displacements do not actuate the valves.

When the load is removed from the vehicle, the frame is raised relative to the wheels, the movement actuates and opens the escape valve, which therefore permits the liquid to be returned to the reservoir of the pump to be again circulated when required. With the escape of liquid, the frame, body, and load, are lowered until they reach the normal position of suspension when the liquid control valves automatically close, the vehicle remaining thereafter substantially in its normal position of suspension until the load is again changed.

The manner of operation of the control valves 62 and 64, and the automatic brake control valves 70 and 71, by liquid instead of air is the same as described.

Figure 22:
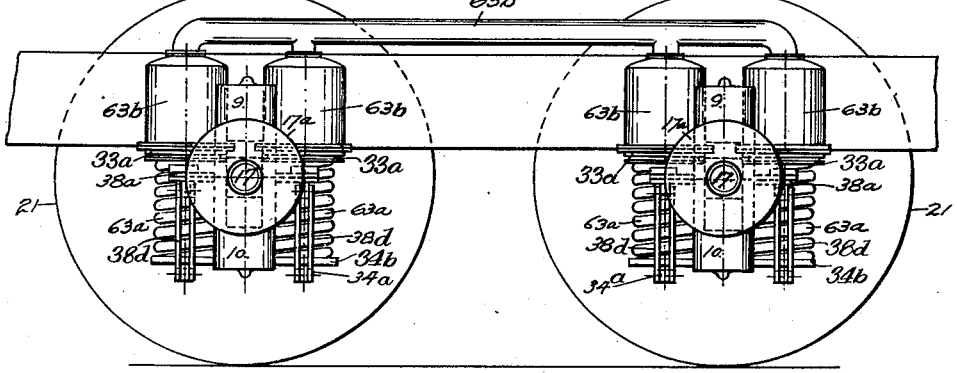
Fig. 22 is a longitudinal view of twin axles applied to a bus, truck, or trailer frame, showing the disposition of helical spring suspension assemblies and the conduit connecting the compensating chambers of the same.
Figure 23:
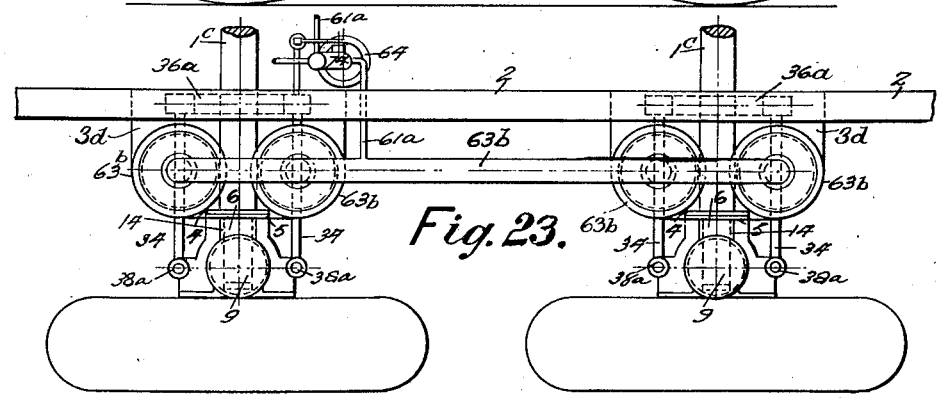
Fig. 23 is a plan of Fig. 21.

Figs. 22 and 23 illustrate the application of my invention to a trailer type of vehicle, having twin axles adjacent to each other and independent sprung wheels; in the drawings tubular axles 1c are each rigidly secured to the side-rail 2 of the frame of the vehicle, by brackets 3d. Each end of the respective axle terminates with a flange 4 to which a second flange 5, integral with the horizontal extending piston guide arm 6 is attached and supports vertically at its outer end an upper piston 7 and a lower piston 8, integral with each other, disposed in or adjacent to the plane of the wheel and adapted to guide the vertical movements of the wheel assembly thereon.

Cylinders 9 and 10 engage respectively with the said pistons 7 and 8, and are secured to each other by flanges 11 and 12 and bolts 13.

The cylinders and wheel assembly associated therewith, reciprocate on the pistons and cooperate to act as snubbing means, to dampen excessive rebound of the springs and cushion the assemblies at the extremities of their displacement thereon. The said cylinders are constrained in the horizontal plane by arms 14 in sliding engagement with the piston guide arms 6. The plate 15 covers the opening therein and excludes dust therefrom.

An outwardly extending stub arm attached to the cylinders 9 and 10 supports the rotatable wheel and brake assembly.

Helical springs 63a, disposed on each side of the axle 1c, are respectively in engagement at one end of the spring with the upper face of the plunger 33b in the cylinder 63b, and at the other end thereof with the bracket 34b attached to the lever 34a.

To transmit the reciprocating movement of the cylinders 9 and 10 on the guide pistons 7 and 8, to the plunger 33b, levers 34d are pivotally secured to brackets 36a attached to the axle 1c, and at their outer ends to the cylinders 9 and 10 by links 38d pivotally secured thereto by studs 38a.

A conduit 63c connects the fluid compensating chambers of the cylinders 63, and is adapted to equalize the displacements and diffuse the shocks received from the road, which otherwise would be transmitted direct to the frame. The conduit permits the liquid in the said chambers to freely pass from one to the other, and thereby equalize the stresses of the wheel assemblies, with reduced inertia and friction of the parts.

Liquid is supplied from a pump on the tractor or other pressure source to the cylinder 63b and when discharged therefrom is returned to the power source, through control valve 64 and the conduit 61a. One control valve regulates the pressure in both wheel assemblies adjacent to each other on the same side of the vehicle.

In the above specification and drawings, reference is made to the cylinder, of the suspension device being attached to the axle or frame of the vehicle, and the cooperating plunger to the oscillatory movement of the wheel assembly; it will be apparent that under certain circumstances it may be advantageous to reverse the position of the elements of the device, without departing from the scope of my invention.

In lieu of the cylinder and plunger type of compensating chamber means herein described, I may substitute a diaphragm type of chamber, particularly when applied to light vehicles, viz, passenger cars, wherein the ratio of "tare weight" to the "loaded weight" is relatively small. In such an arrangement the compensating fluid under pressure is applied to one face of the diaphragm and the suspension spring means to the other side thereof, sufficient movement of the diaphragm being provided to compensate for the spring displacement between the "tare weight" and the maximum load the vehicle may carry.

Referring to the means of regulating the supply and discharge of fluid to and from the suspension devices, I do not confine my invention to the particular construction of the valve means and method of operating the same as herein described and shown, but other means to perform this end may be adapted without departing from the scope of my invention.

The above described liquid brake actuating system associated with the suspension assemblies, may be operated by manual effort in the conventional manner in lieu of power means herein referred to.

The helical type springs also associated with the above described assemblies may be substituted by springs of a different form and may be located on the vehicle in different positions and be incorporated and operate with compensating chamber means.

Further, air or liquid or both, may be the fluid means incorporated in the snubber or dash-pots formed by the guide pistons and cooperating cylinders forming part of the wheel assembly, without departing from the scope and ambit of my invention.

Having thus described my invention, what I claim as new therein and desire to secure as Letters Patent is:—

1. In a suspension system for vehicles, in combination, a supporting axle attached to the frame or body of the vehicle, a stub axle disposed at the outer end of the supporting axle, a wheel rotatably mounted on the stub axle, means associated respectively with the stub axle and wheel assembly, and with the supporting axle, in cooperative engagement therebetween, adapted to guide the wheel assembly in the vertical and horizontal planes, spring means on the vehicle, comprising, a cylinder and cooperating plunger device forming a chamber containing fluid under pressure, elastic means in yielding engagement with the plunger to support the vehicle and load thereon, means on the vehicle in cooperative engagement respectively with the plunger and wheel assembly, to transmit the vertical displacements of the latter to the elastic means, and means for regulating the pressure of fluid in the said chamber so that the pressure of the fluid therein is always proportional to any given load on the vehicle.

2. In a suspension system for vehicles, in combination, a supporting axle attached to the frame or body of the vehicle, an upright guide piston secured to the outer end thereof, a cylinder in cooperative engagement therewith including means for guiding the same on the axle in the horizontal plane, an outwardly extending axle supported by the cylinder means, a wheel rotatably mounted thereon, spring means on the vehicle, comprising, a cylinder and cooperating plunger device, forming a chamber containing fluid under pressure, elastic means in yielding engagement with the plunger to support the vehicle and load thereon, members, supported on the sprung part of the vehicle, in cooperative engagement respectively with the plunger and wheel assembly, to transmit the vertical displacements of the latter to the elastic means, and means, operated by the said vertical displacements of the wheel assembly, to automatically regulate the pressure of fluid in the said chamber so that the pressure of fluid therein is always proportional to any given load on the vehicle.

3. In a suspension system for vehicles, in combination, a supporting axle attached to the frame or body of the vehicle, a stub axle disposed at the outer end of the supporting axle, a wheel rotatably mounted on the stub axle, means, associated respectively with the stub axle and wheel assembly, and with the supporting axle, in cooperative engagement therebetween, adapted to guide the wheel assembly in the vertical and horizontal planes, spring means on the vehicle, comprising, a cylinder and cooperating plunger device, forming a chamber containing fluid under pressure, elastic means in yielding engagement with the plunger to support the vehicle and load thereon, means on the vehicle, in cooperative engagement respectively with the plunger and wheel assembly, to transmit the vertical displacements of the latter to the elastic means, and means, operated by the said vertical movement of the wheel assembly, to automatically regulate the pressure of fluid in the said chamber so that the pressure of fluid therein is always proportional to any given load on the vehicle, including means for damping the action of the regulating means so that only changes in the static load on the vehicle operates the regulating means.

4. In a suspension system for vehicles, in combination, a supporting axle attached to the frame or body of the vehicle, an upright guide piston secured to the outer end thereof, a cylinder in cooperating engagement therewith, having means adapted to constrain the cylinder in the horizontal plane, an outwardly extending stub axle supported by the cylinder, a wheel rotatably mounted thereon, a fluid cushioning device acting as a vehicle spring, comprising, a cylinder and cooperating plunger forming a chamber containing air under pressure, in yielding engagement with the plunger to support the vehicle and load thereon, members, supported on the sprung part of the vehicle, in cooperative engagement respectively with the plunger and wheel assembly, to transmit the load and vertical displacements of the wheel assembly to the air cushion in the device, valve means, operated by the vertical movement of the wheel assembly, to increase or decrease the pressure of air in the device proportional to changes in the static load on the vehicle, including means for damping the action of the valves.

5. In a suspension system for vehicles, comprising, in combination, a supporting axle attached to the frame or body of the vehicle, an upright guide piston secured to the outer end thereof, a cylinder in cooperative engagement therewith, having means adapted to constrain the cylinder in the horizontal plane, fluid contained in and between the cylinder and guide piston, conduit means, connecting the upper and lower parts of the cylinder, and means for regulating the flow of the fluid therethrough to snub and cushion the movement of the cylinder on the piston and the rebound of the wheel assembly, a stub axle supported by the cylinder, a wheel rotatably mounted thereon, spring means, disposed on the vehicle, to support the latter and the load, and means on the vehicle arranged to transmit the vertical movement of the wheel assembly to the spring means.

6. In a suspension system for vehicles, in combination, a supporting axle attached to the frame or body of the vehicle, an upright guide piston secured to the outer end thereof, a cylinder in cooperative engagement therewith, including means for guiding the same on the axle in the horizontal plane, an outwardly extending stub axle supported by the cylinder means, a wheel rotatably mounted thereon, spring means on the vehicle, comprising, a cylinder and cooperating plunger device, forming a chamber containing fluid under pressure, elastic means, in yielding engagement with the plunger, to support the vehicle and load thereon, means, in cooperative engagement respectively with the plunger and wheel assembly, to transmit the vertical displacements of the latter to the elastic means, comprising, levers, attached to an oscillatory shaft supported on the vehicle, arranged to provide different ratio of displacement therebetween, and means for regulating the pressure of the fluid in the said chamber so that the pressure of fluid therein is always proportional to any given load on the vehicle.

7. A suspension system for vehicles, in combination, a supporting axle attached to the frame or body of the vehicle, an outwardly extending stub axle disposed at the outer end of the supporting axle, a wheel rotatably mounted on the stub axle, means associated respectively with the stub axle and wheel assembly, and with the supporting axles, in cooperative engagement therebetween, adapted to guide and constrain the stub axle and wheel assembly in the vertical and horizontal planes, a fluid cushioning device, acting as a vehicle spring, comprising, a cylinder and cooperating plunger, forming a chamber containing air under pressure in yielding engagement with the plunger to support the vehicle and load thereon, a tubular member, adapted to strengthen the frame or body of the vehicle and form an air reservoir in communication with the said chamber, to augment the volume of air therein to provide the required "spring rate", means supported on the vehicle, in cooperative engagement respectively with the plunger and wheel assembly, to transmit the vertical displacement of the latter to the air cushion in the device, and means for regulating the pressure of fluid in the said chamber so that the pressure of fluid therein is always proportional to any given load on the vehicle.

8. In a suspension system for vehicles, in combination, a supporting axle attached to the frame or body of the vehicle, a stub axle disposed at the outer end of the supporting axle, a wheel rotatably mounted on the stub axle, means adapted to guide the wheel assembly in the vertical and horizontal planes, means on the vehicle, comprising, a cylinder and cooperative plunger device, forming a chamber containing fluid under pressure, elastic means in yielding engagement with the plunger to support the vehicle and load on the wheel assembly, means for regulating the pressure of fluid in said chamber so that the pressure of fluid therein is always proportional to any given load on the vehicle, and means to permit the said pressure in the chamber to automatically control the actuating fluid pressure in the brake system, when the vehicle is partly or completely unloaded, to prevent the locking and skidding of the wheel.

9. In a suspension system for vehicles, in combination, a supporting axle attached to the frame or body of the vehicle, a stub axle disposed at the outer end of the supporting axle, a wheel rotatably mounted on the stub axle, means associated respectively with the stub axle and wheel assembly, and the supporting axle, in cooperative engagement therebetween, adapted to guide the wheel assembly in the vertical and horizontal planes, spring means on the vehicle, comprising, a cylinder and cooperating plunger device, forming a chamber containing fluid under pressure, elastic means, in yielding engagement with the plunger to support the vehicle and load thereon, means on the vehicle, in cooperative engagement respectively with the plunger and wheel assembly, to transmit the vertical displacements to the elastic means, means for regulating the pressure of fluid in the said chamber so that the pressure of fluid therein is always proportional to any given load on the vehicle, and means adapted to permit the said pressure in the chamber to automatically control the actuating fluid pressure in the brake system, when the vehicle is partly or completely unloaded, to prevent locking and skidding of the wheel, comprising, a valve body, a diaphragm forming on one side therewith a chamber subject to the fluid pressure in the chamber of the spring device, and on the opposite side exposed to the brake actuating fluid pressure in the conduit of the brake system, a valve, operated by the diaphragm to open and close the said conduit, a spring, in engagement with and acting on the diaphragm in the direction to close the valve, and means for adjusting the pressure of the spring to regulate the ratio of fluid pressure respectively acting on each side of the diaphragm.

10. In a suspension system for vehicles, comprising, in combination, a supporting axle attached to the frame or body of the vehicle, an outwardly extending stub axle disposed at the outer end of the supporting axle, a wheel rotatably mounted on the stub axle, means adapted to guide and constrain the stub axle and wheel assembly in the vertical and horizontal planes, means on the vehicle, comprising, a cylinder and cooperative plunger device, forming a chamber containing liquid under pressure, steel spring means, in engagement with the plunger to support the vehicle and load thereon, means, on the vehicle, adapted to transmit the vertical displacements of the wheel assembly to the spring means and plunger of the device, and means operated by the vertical movement of the wheel assembly, to automatically regulate the pressure of liquid in the said chamber so that the pressure of liquid therein is always proportional to any given load on the vehicle.

11. In a suspension system for vehicles, in combination, a supporting axle attached to the frame or body of the vehicle, an upright guide piston secured to the outer end thereof, a cylinder in cooperative engagement therewith having means adapted to constrain the cylinder in the horizontal plane, an outwardly extending stub axle supported by the cylinder, a wheel rotatably mounted thereon, spring means on the vehicle, comprising, a cylinder and cooperating plunger device forming a chamber containing liquid under pressure, steel spring means, in yielding engagement with the plunger to support the vehicle and load thereon, means on the vehicle adapted to transmit the vertical motion of the wheel assembly to the spring means, a pump, driven from a power source, conduit means, to supply liquid under pressure from the pump to the chamber of the device, and means to return discharged liquid therefrom to the pump, and means, operated by the vertical movement of the wheel assembly to automatically regulate the pressure of liquid in the said chamber of the device so that the pressure of liquid therein is always proportional to any given load on the vehicle.

12. In a suspension system for vehicles, comprising, in combination, a supporting axle attached to the frame or body of the vehicle, an upright guide piston secured to the outer end thereof, a cylinder in cooperative engagement therewith having means adapted to guide and constrain the cylinder in the horizontal plane, liquid contained in and between the cylinder and guide piston, conduit means through the guide piston connecting the upper and lower parts of the cylinder, and means for regulating the flow of liquid therethrough to snub and cushion the rebound of the wheel assembly, a stub axle supported by the cylinder, a wheel rotatably mounted thereon, spring means disposed on the vehicle to support the vehicle and load, and means on the vehicle, arranged to transmit the load and vertical displacements of the wheel assembly to the spring means.

13. In a suspension system for vehicles, in combination, a supporting axle attached to the frame or body of the vehicle, a stub axle disposed at the outer end of the supporting axle, a wheel rotatably mounted thereon, means associated respectively with the stub axle and wheel assembly, and the supporting axle in cooperative engagement therebetween, adapted to guide the wheel assembly in the vertical and horizontal planes, spring means on the vehicle, comprising, a cylinder and cooperating plunger device forming a chamber containing fluid under pressure, elastic means, in yielding engagement with the plunger, to support the vehicle and load thereon, means on the vehicle, adapted to transmit the vertical motion of the wheel assembly to the elastic means, a pump driven from a power source, arranged to supply liquid under pressure to the chamber of the spring means and to the liquid actuated brake system, including means for returning the escaped liquid therefrom to the pump, means for regulating the pressure of liquid in the chamber of the device so that the pressure of liquid therein is always proportional to any given load on the vehicle, a manually operated control valve to apply and release pressure to the brake system, including means adapted to permit the pressure in the chamber of the device to automatically control and limit the actuating pressure in the brake system when the vehicle is partially or completely unloaded.

14. In a suspension system for vehicles, having four or more wheels adjacent to each other forming a group adapted to jointly support part of the frame and load thereof, in combination, suspension means respectively associated with each wheel, comprising, a supporting axle attached to the frame or body of the vehicle, a stub axle disposed at the outer end of the supporting axle, a wheel rotatably mounted on the stub axle, means associated respectively with the stub axle and wheel assembly and the supporting axle, in cooperative engagement therebetween, adapted to guide the wheel assembly in the vertical and horizontal planes, spring means, comprising, a cylinder and cooperating plunger device, forming a chamber containing fluid under pressure, elastic means in yielding engagement with the plunger to support the vehicle and load thereon, conduit means, arranged to connect the said chambers of the associated devices of the adjacent wheels, to permit free flow of fluid therebetween, to equalize the pressure therein and diffuse the shocks, means on the vehicle, in cooperative engagement respectively with the plunger and wheel assembly, to transmit the vertical displacements of the latter to the elastic means, and means for regulating the pressure of the fluid in the said chambers of the device so that the pressure of the fluid therein is always proportional to any given load on the vehicle.

15. In a suspension system for vehicles, in combination, a supporting axle attached to the frame or body of the vehicle, a stub axle disposed at the outer end of the supporting axle, a wheel rotatably mounted on the stub axle, means adapted to guide the wheel assembly in the vertical and horizontal planes, means on the vehicle, comprising, a cylinder and cooperating plunger device, forming a chamber containing fluid under pressure, elastic means in yielding engagement with the plunger to support the vehicle and load thereon, means on the vehicle in cooperative engagement respectively with the plunger and wheel assembly, to transmit the vertical displacements of the latter to the elastic means, and means for regulating the fluid pressure in the chamber so that the pressure of fluid therein is always proportional to any given load on the vehicle, comprising, a fluid inlet and outlet valve, actuating means adapted to open said valves, normally maintained closed by spring means, a tube and cooperating piston and rod in reciprocable engagement respectively attached to a part of the wheel assembly and the actuating means, spring means disposed on each side of the piston between the latter and the ends of the tube, and means attached to the actuating means for damping the action of the valves.

16. In a suspension system for vehicles, in combination, a supporting axle attached to the frame or body of the vehicle, a stub axle disposed at the outer end of the supporting axle, a wheel rotatably mounted on the stub axle, means adapted to guide the wheel assembly in the vertical and horizontal planes, means on the vehicle, comprising, a cylinder and cooperating plunger device, forming a chamber containing fluid under pressure, elastic means in yielding engagement with the plunger to support the vehicle and load thereon, means on the vehicle in cooperative engagement respectively with the plunger and wheel assembly, to transmit the vertical displacements of the latter to the elastic means, and means for regulating the fluid pressure in the chamber so that the pressure of fluid therein is always proportional to any given load on the vehicle, comprising, a fluid inlet and outlet valve, actuating means adapted to open said valves, normally maintained closed by spring means, a tube and cooperating piston and rod in reciprocable engagement, respectively attached to a part of the wheel assembly and the actuating means, spring means disposed on each side of the piston between the latter and the ends of the tube, and means attached to the actuating means for damping the action of the valves, consisting of a cylinder and cooperating piston, liquid contained in and between the piston and cylinder means, and means arranged to permit the liquid to pass from one side thereof to the other side, including means to regulate the flow in either direction.

GEORGE WILLIAM BELL.